United States Patent
Matama

(10) Patent No.: US 7,113,619 B1
(45) Date of Patent: Sep. 26, 2006

(54) IMAGE READING METHOD, IMAGE READING APPARATUS AND METHOD OF DISCRIMINATING DEFECT OF IMAGE DATA

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 397 days.

(21) Appl. No.: 09/657,272

(22) Filed: Sep. 7, 2000

(30) Foreign Application Priority Data

Sep. 7, 1999 (JP) ................................ 11-252771

(51) Int. Cl.
*G06K 9/00* (2006.01)

(52) U.S. Cl. ...................................... 382/112; 382/275

(58) Field of Classification Search ................ 382/112, 382/275
See application file for complete search history.

(56) References Cited

U.S. PATENT DOCUMENTS

| 5,214,470 A * | 5/1993 | Denber .................... 355/75 |
| 5,266,805 A | 11/1993 | Edgar ........................ 250/330 |
| 6,034,766 A * | 3/2000 | Sugiura et al. .......... 356/239.1 |
| 6,034,794 A * | 3/2000 | Suganuma .................. 358/518 |
| 6,393,161 B1 * | 5/2002 | Stevenson et al. .......... 382/275 |

FOREIGN PATENT DOCUMENTS

| GB | 1547811 A * | 6/1979 |
| GB | 2140245 A * | 11/1984 |
| JP | 2559970 | 9/1996 |

* cited by examiner

*Primary Examiner*—Bhavesh M. Mehta
*Assistant Examiner*—Patrick Edwards
(74) *Attorney, Agent, or Firm*—Sughrue Mion, PLLC

(57) ABSTRACT

The image reading method apparatus read an image on an image recording medium by a visible light, read by scanning a specified detecting light in a one-dimensional direction using an optical path of the visible light and detect at least one of a foreign matter which adheres and a scratch which exists in the optical path of the visible light based on continuity of change of light quantity data of the thus read specified detecting light in the one-dimensional direction. The discriminating method of the defect of the image data detects optical defects exiting in the optical system and on the image reading medium. The method and apparatus are capable of obtaining a high-quality print image by preventing the foreign matter such as dust, dirt or the like which adheres or the scratch such as an abrasion, cut or the like which exists in the image reading optical path or on the image recording medium from being transcribed onto a print image by the visible light.

22 Claims, 5 Drawing Sheets

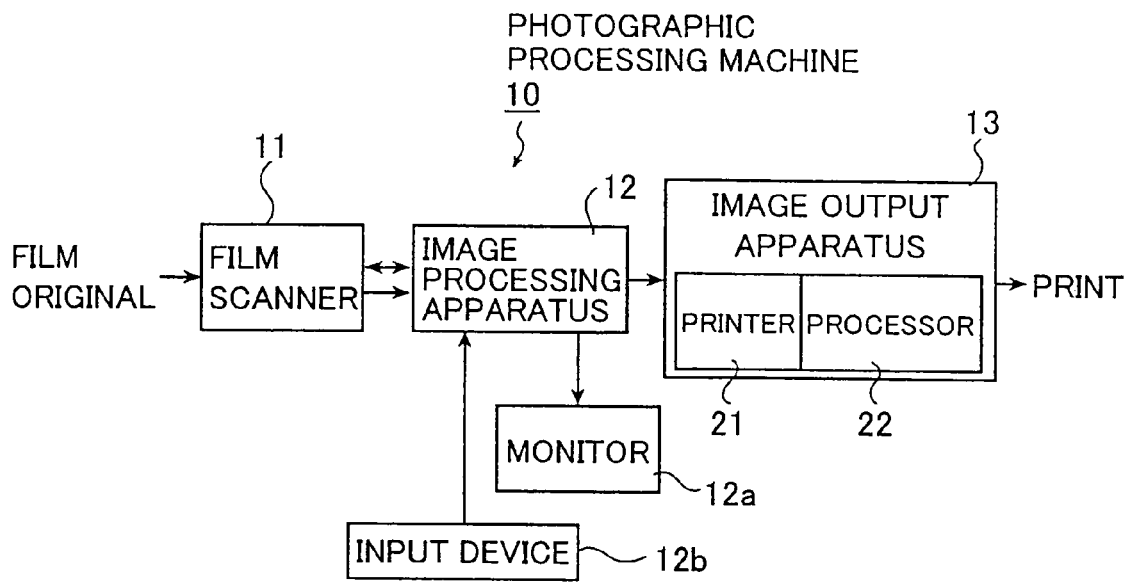
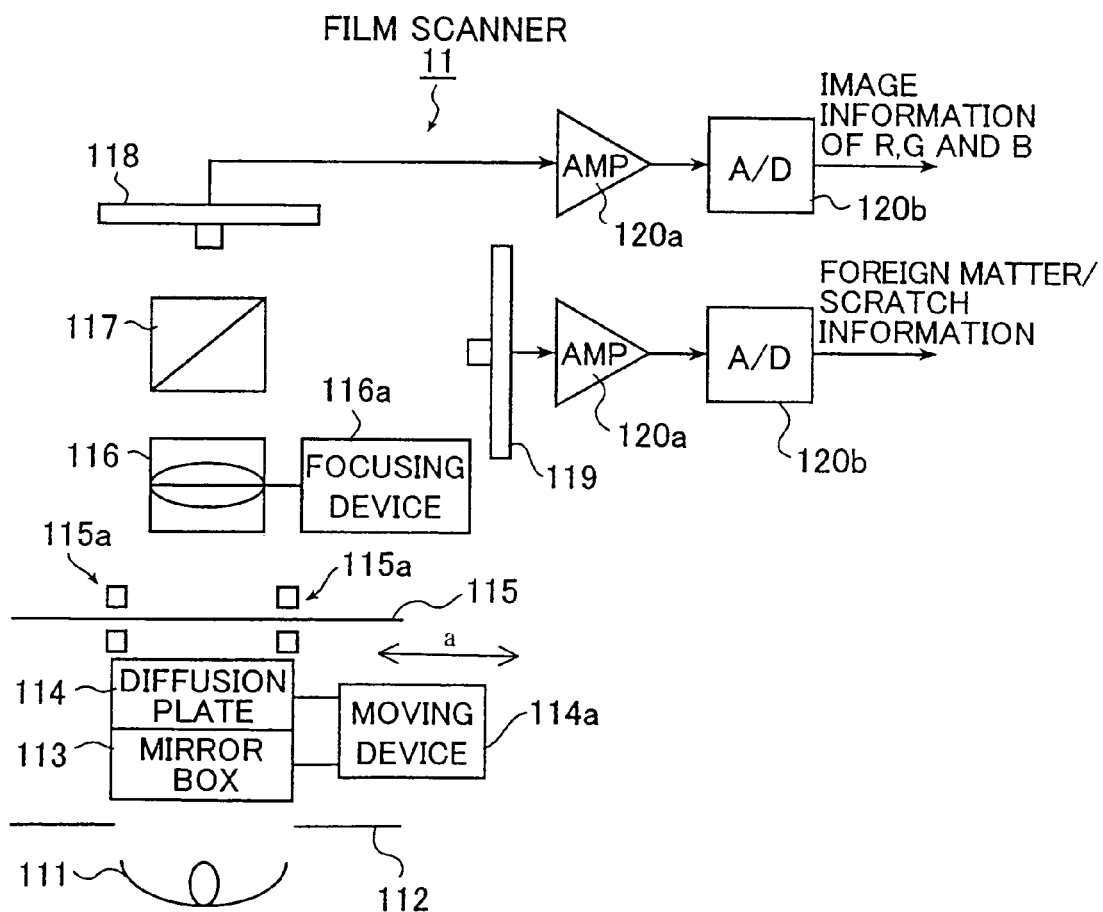

IMAGE READING METHOD, IMAGE READING APPARATUS AND METHOD OF DISCRIMINATING DEFECT OF IMAGE DATA

BACKGROUND OF THE INVENTION

The present invention relates to an image reading method, an image reading apparatus and a method of discriminating a defect of image data, and more particularly to an image reading method in which an image on an image recording medium such as film or the like (hereinafter referred to simply as "film") is read by a visible light and also a scratch, a folding mark, or a foreign matter such as dirt, dust, grime or the like on the film (second optical defect) and a scratch, or a foreign matter such as dirt, dust, grime or the like in an optical path of an optical system (first optical defect) in the image reading apparatus are detected by a specified detecting light, for example, preferably an invisible light such as an infrared light or the like, and an image reading apparatus adapted to the image reading method and a method of discriminating a defect of image data.

Heretofore, the images recorded on photographic films such as negative films, positive (reversal) films (which are hereinafter also referred to simply as "films") have been commonly printed on photographic light-sensitive materials such as photographic paper and the like by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing schemes to produce image data for recording purposes; recording light that has been modulated in accordance with the image data is used to scan and expose a light-sensitive material to record an image. The printer operating on this principle has been commercialized as a digital printer.

In the digital printer, images are converted to digital image data which are processed to determine the exposing conditions for printing. Hence, the digital printer is capable of performing effective image processing operations such as the correction of washed-out highlights or flat shadows due to the taking of pictures with back light or an electronic flash, sharpening and the correction of color or density failure and this enables the production of high-quality prints that have been impossible to attain by the conventional direct exposure technique. In addition, not only the assembling of plural images and the dividing of a single image but also the compositing of characters on image can be performed by processing the image data and, as a result, prints can be outputted after various editing and/or processing operations have been performed in accordance with specific uses.

Having these features, the digital printer is basically composed of an image input machine having a scanner (image reading apparatus) that reads the image on a film photoelectrically and an image processing apparatus that processes the image read with the scanner to produce output image data (exposing conditions) as well as an image output machine having a printer that scans and exposes a light-sensitive material in accordance with the image data outputted from the image input machine to record an image (a latent image) and a processor that performs development and other necessary processing on the exposed light-sensitive material to produce a print.

In the above-described scanner, reading light issuing from a light source is allowed to be incident on film, from which projected light bearing the image recorded on the film is produced and focused by an imaging lens to form a sharp image on an image sensor such as a CCD sensor; the image is then read by photoelectric conversion and sent to the image processing apparatus as image data (i.e., signals) for the film after being optionally subjected to various image processing schemes.

In the image processing apparatus, image processing conditions are set on the basis of the image data read with the scanner and image processing as determined by the thus set conditions is performed on the read image data and the resulting output image data for image recording are sent to the printer.

In the printer, if it is of a type that relies upon exposure by scanning with an optical beam, this optical beam is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. Development and other processing are then performed in the processor rendering the latent image visible to produce a print reproducing the image that was recorded on the film.

It is essential that the original of a print to be produced or the film should be in a good condition in order to secure a high-definition print reproducing a high-quality image thereon. The film is transported in a camera for photographing, a developing apparatus for development and a scanner for reading (printing). During the transport, the surfaces of the film are in sliding contact with support members of the camera, the developing apparatus or the scanner. As a result, a scratch may often be produced on a surface of the film. Further, the film is very often treated in an ordinary environment in which any particular air cleaning is not performed; hence, a foreign matter such as dirt, dust, grime or the like is likely to adhere to the surface thereof.

As described above, when the image recorded on the film is read with the scanner, reading light is allowed to be incident on the film to produce projected light that is photoelectrically read with the CCD sensor or the like. In this process, any foreign matter which adheres to the film surfaces or any damage thereof blocks out or diffuses the reading light (projected light) thereby reducing the quantity of light. In case of a deep scratch, the quantity of transmitted light of the reading light is increased to the contrary whereby the light intensity of the projected light incident on the CCD sensor becomes inappropriate and no longer corresponds to the image on the film.

As a result, a high-quality image can not be obtained, since the foreign matter or the scratch is reproduced like a shadow on the obtained image and the peripheral image portion of the scratch looks blurred on the obtained image.

To deal with the above-described problems, various methods have been proposed. For example, Japanese Patent Publication No. 2559970 discloses a technique.

In the technique, there are provided a method and apparatus for use in correcting influences of defects of a storage medium (image recording medium, namely, film) to an image stored in the film. This method and apparatus apply infrared ray energy and visible light ray energy to the film, detecting a resulting infrared ray energy distribution corresponding to each defect in correspondence with each position on the film, detect a visible light ray energy distribution in correspondence with each position on the film, and enhance the intensity of the visible light ray energy distribution in the position of interest up to a level which offsets the intensity of the infrared ray energy distribution in the position of interest when intensity of the thus detected infrared ray energy distribution is larger than a specified threshold value in each position on the film, or correct the visible light ray energy distribution in the position of interest by interpolation when the intensity of the thus detected infrared ray energy distribution is smaller than the specified threshold value to the contrary, thereby correcting the effects of defects of the film.

In the digital printer, there exists another problem that dust enters an optical path in the printer itself or a member in the optical path is damaged; hence, the problem prevents a high-quality image from being obtained.

To take an example, a diffusion plate incorporated in light source unit for use in illuminating the film is often placed in a horizontal state and, since the film frequently passes above the diffusion plate or in the neighborhood thereof, the foreign matter such as the dust, dirt, grime or the like is likely to adhere thereto and a scratch is easily produced thereon.

As described above, in the case that the foreign matter such as the dust, dirt or the like adheres to the diffusion plate or the scratch exists therein, since the foreign matter or the scratch appears in a streak form in an image at reading the film with a line scanner, it is easily noticeable; hence, it is likely to be a serious problem. Moreover, unlike the foreign matter or the scratch on the film, the foreign matter which adheres to or the scratch which exists in the diffusion plate appears in all images to be outputted in succession so that the influence thereof will be even greater.

SUMMARY OF THE INVENTION

A primary object of the present invention is to solve the above-described prior art problems, particularly, by providing an image reading method that is capable of detecting by a specified detecting light, preferably, an invisible light a foreign matter such as dust, dirt, grime or the like or a scratch such as an abrasion, a cut or the like which exists not only on an image recording medium but also in an image reading optical path of a visible light almost at the same time when an image on the image recording medium such as film is read by a visible light to prevent the foreign matter such as the dust, dirt or the like or the scratch on the image recording medium and in the image reading optical path from being transferred onto a print image whereupon a high-quality print image can be obtained, an image reading apparatus adapted to the above-described method and a method of discriminating a defect or the thus read image data.

In order to attain the object described above, the first aspect of the present invention provides an image reading method which reads an image on an image recording medium by a visible light, comprising the steps of reading by scanning a specified detecting light in a one-dimensional direction using an optical path of the visible light, and detecting at least one of a foreign matter which adheres and a scratch which exists in the optical path of the visible light based on continuity of change of light quantity data of the thus read specified detecting light in the one-dimensional direction.

Preferably, when the change of the thus read light quantity data is detected in a continuous state in the one-dimensional direction at a specified reading position perpendicular to the one-dimensional direction, at least one of the foreign matter and scratch is detected.

Preferably, at least one of the foreign matter which adheres and the scratch which exists in the optical path is detected by detecting the change of the light quantity data in a streak form that has grown up in a same sensor position by means of a line sensor for the specified detecting light.

Preferably, scanning in the one-dimensional direction for reading the specified detecting light by making use of the optical path of the visible light is performed by allowing the image recording medium and the line sensor to move relatively by means of transferring the image recording medium in relation to the line sensor, or by reading the specified detecting light with the line sensor for a specified period of time in a same way as in a case of transferring the image recording medium in relation to the line sensor, if the image recording medium is disposed outside of the optical path.

Preferably, scanning in the one-dimensional direction for reading the specified detecting light by making use of the optical path of the visible light is performed by allowing the image recording medium or the specified detecting light and the line sensor to move relatively by means of scanning by transferring a mirror in the optical path.

It is preferable that the image reading method described above further comprises the step of issuing an alarm, when at least one of the foreign matter which adheres or the scratch which exists in the optical path is detected.

Preferably, at least one of the foreign matter and the scratch which adheres to or exists on an optical element in the optical path.

Preferably, the optical element is at least one of a diffusion plate and a mirror.

Preferably, a position of the optical element is changed in accordance with a detection result of at least one of the foreign matter and the scratch which adheres to or exists on the optical element in the optical path.

Preferably, an area in which at least one of the foreign matter which adheres and the scratch which exists in the optical path is detected is enlarged.

Preferably, the specified detecting light is the visible light.

Preferably, when the visible light is read by scanning in the one-dimensional direction by making use of the optical path of the visible light, the image recording medium is removed from the optical path of the visible light.

Preferably, the specified detecting light is an invisible light.

Preferably, at least one of the foreign matter and the scratch on the image reading medium is detected by the invisible light.

Preferably, focusing positions of the specified detecting light and the invisible light are changed from one another in accordance with whether at least one of the foreign matter which adheres and the scratch exists in the optical path is detected by the specified detecting light or at least one of the foreign matter and the scratch on the image recording medium is detected by the invisible light.

Preferably, the specified detecting light is the invisible light, and wherein focusing positions of the invisible light are changed from one another in accordance with whether at least one of the foreign matter which adheres and the scratch which exists in the optical path is detected by the invisible light or at least one of the foreign matter and the scratch on the image recording medium is detected by the invisible light.

The present invention is able to be actualized as an image reading apparatus to which the describe-above image reading method is applied.

The second aspect of the present invention provides an image reading apparatus, comprising a first reading unit for reading an image on an image recording medium by a visible light, a second reading unit for reading a specified detecting light by scanning it in a one-dimensional direction by making use of an optical path of the visible light, and a first detecting unit for detecting at least one of a foreign matter which adheres and a scratch which exists in an optical path of the visible light based on continuity of change of light quantity data of the specified detecting light read by the second reading unit in the one-dimensional direction.

Preferably, the first detecting unit detects at least one of the foreign matter and the scratch by detecting the change of the light quantity data continuously in the one-dimensional direction at a specified reading position which is perpendicular to the one-dimensional direction.

Preferably, the second reading unit comprises a line sensor and a moving device for relatively moving the specified detecting light in the one-dimensional direction in relation to the line sensor, and wherein the first detecting unit detects at least one of the foreign matter which adheres and the scratch which exists in the optical path by detecting the change of the light quantity data in a streak form that has grown up in a same sensor position of the line sensor.

Preferably, the second reading unit allows the image recording medium and the line sensor to move relatively by transferring the image recording medium in relation to the line sensor by means of the moving device, or by reading the specified detecting light with the line sensor for a specified period of time in a same way as in a case of transferring the image reading medium in relation to the line sensor, if the image recording medium is disposed outside of the optical path.

Preferably, the second reading unit allows the image recording medium or the specified detecting light and the line sensor to move relatively by means of scanning by transferring the mirror in the optical path with the moving device.

It is preferable that the image reading apparatus described above further comprises an alarming device for issuing an alarm when the first detecting device detects at least one of the foreign matter which adheres and the scratch which exists in the optical path.

Preferably, at least one of the foreign matter and the scratch which adheres to or exists on an optical element disposed in the optical path of the first reading device.

Preferably, the optical element is at least one of a diffusion plate and a mirror.

It is also preferable that the image reading apparatus described above further comprises a first changing device for changing a position of the optical element when the first detecting unit detects at least one of the foreign matter and the scratch which adheres to or exists on the optical element in the optical path.

It is further preferable that the image reading apparatus described above further comprises an enlarging device for enlarging an area in which at least one of the foreign matter which adheres and the scratch which exists in the optical path is detected.

Preferably, the first detecting unit uses the visible light as the specified detecting light.

Preferably, the second reading unit reads the visible light by scanning in the one-dimensional direction by making use of the optical path of the visible light in a state that the image recording medium is removed from the optical path of the visible light.

Preferably, the first detecting unit uses an invisible light as the specified detecting light.

It is another preferable that the image reading apparatus described above further comprises a second detecting unit for detecting at least one of the foreign matter and the scratch on the image recording medium by the invisible light.

It is still another preferable that the image reading apparatus described above further comprises a second changing device for changing focusing positions of the specified detecting light and the visible light from one another in accordance with whether at least one of the foreign matter which adheres and the scratch which exists in the optical path is detected by the specified detecting light or at least one of the foreign matter and the scratch on the image recording medium is detected by the invisible light.

Preferably, the first detecting unit and the second detecting unit are identical to each other using the invisible light, further comprising a second changing device for changing focusing positions of the invisible light from one another in accordance with whether at least one of the foreign matter which adheres and the scratch which exists in the optical path is detected by the invisible light or at least one of the foreign matter and the scratch on the image recording medium is detected by the invisible light.

The third aspect of the present invention provides a method of discriminating a defect of image data produced from an image which has been formed on an image recording medium, comprising a first detecting step of detecting a first optical defect existing in an optical system which reads the image data from the image recording medium, and a second detecting step of detecting a second optical defect existing on the image recording medium.

Preferably, the first and second detecting steps are based on the same detecting method using an invisible light.

Preferably, in the first detecting step, a focusing position of the invisible light is set on the image recording medium, and wherein, in the second detecting step, the focusing position of the invisible light is removed from the image recording medium.

The image reading method and apparatus according to the present invention have the following operations and effects:

Since the foreign matter such as the dust, dirt, grime or the like or the scratch such as the abrasion, claw, cut or the like which exists not only on the image recording medium (hereinafter represented by "film") but also in the image reading optical path is detected by the specified detecting light, preferably, the invisible light almost at the same time when the image on the film is read by the visible light so that the foreign matter such as the dust, dirt or the like or the scratch not only on the film but also in the image reading optical path is prevented from being transferred onto the print image whereupon the high-quality print image can be obtained.

Specifically, for example, as a result of reading by the specified detecting light, preferably, the invisible light, when the foreign matter such as the dust or the scratch existing in the optical path within the image reading apparatus is detected, any influence thereof is removed by, for example, informing an operator of such detection so as to ask for a command therefrom, changing a position of the optical member (optical element) such as a diffusion plate or mirror to be placed in the optical path to a different position which allows the foreign matter such as the dust or the scratch to be less noticeable or starting a dust removing device previously set up to mechanically or physically remove the foreign matter.

In a more preferable embodiment, more specifically, for example, in film reading by a method which performs both prescan and fine scan, R, G and B prescanned images and an IR (infrared ray) prescanned image are firstly obtained; then, the thus obtained IR prescanned image among them is analyzed; if an abnormality in a streak form (defect of image data due to continuity of light quantity data changes in a scanning direction) is found in a same sensor position therein, such abnormality is judged as being derived from the foreign matter such as the dust or the like which adheres to the optical element such as the diffusion plate, mirror or the like, or the scratch produced thereon whereupon necessary processing such as those described above are executed.

In this case, when the IR prescanned image is obtained, if a focusing point is shifted in a direction to the optical element such as the diffusion plate or the like, the foreign matter such as the dust or the like which adheres to the optical element such as the diffusion plate, mirror or the like, or the scratch which exists thereon can more securely be detected; however, the foreign matter such as the dust or the like which adheres to the optical element such as the diffusion plate or the like or the scratch which exists thereon can sufficiently be detected without depending on the method described above. After such detection, fine scan is implemented and then a well-known correction (so-called scratch vanishing processing) of the foreign matter such as the dust or the like, the scratch or the like (defect of image data) is performed.

The film reading by the IR as described above can also be implemented while an original such as film exists in the optical path. This is advantageous from the point of easy handling since it is not necessary to remove the film from the apparatus whenever it is checked whether or not the foreign matter such as the dust or the like or the scratch is present in the optical path.

BRIEF DESCRIPTION OF THE DRAWINGS

FIG. 1 is a block diagram schematically showing an embodiment of a photographic processing machine applying an image reading apparatus according to an embodiment of the present invention;

FIG. 2 is a diagrammatic view showing an illustrative construction of an embodiment of a film scanner used in the photographic processing machine shown in FIG. 1;

DETAILED DESCRIPTION OF THE INVENTION

Figure 3:
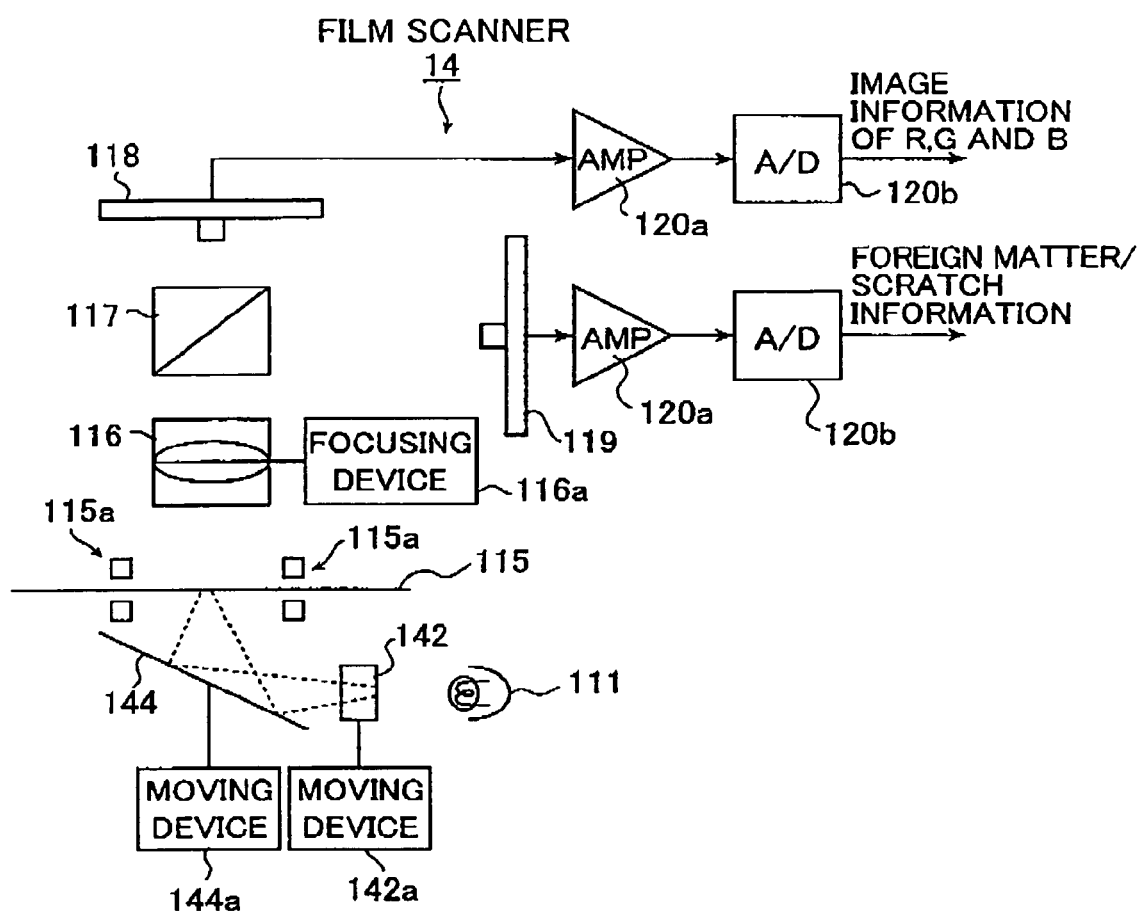
FIG. 3 is a diagrammatic view showing an illustrative construction of another embodiment of the film scanner used in the photographic processing machine shown in FIG. 1.

An image reading method, an image reading apparatus and a method of discriminating a defect of image data according to the present invention are described in detail below with reference to the preferred embodiments shown in the accompanying drawings.

FIG. 1 is a block diagram schematically showing an embodiment of photographic processing machine applying an image reading apparatus (scanner) according to an embodiment of the present invention. FIG. 2 diagrammatically shows a schematic construction of an embodiment of an image reading apparatus according to the present invention. The image reading apparatus shown in FIG. 2 reads an image on an image recording medium using a visible light and the image recording medium using an infrared light which is an invisible light as a specified detecting light for a foreign matter or a scratch by simultaneous scanning them in a one-dimensional direction using the same optical path. However, the present invention is not limited to the above embodiment.

A photographic processing machine 10 shown in FIG. 1 includes a film scanner 11, an image processing apparatus 12 and an image output apparatus 13.

The film scanner 11 which is an embodiment of an image reading apparatus according to the present invention reads photoelectrically a film original which is an image reading medium. The image processing apparatus 12 which performs necessary image processing on the image thus read by the film scanner 11 and detects a foreign matter or a scratch from information of the foreign matter or the scratch read by the film scanner 11. The image output apparatus 13 has a printer 21 for scan-exposing a photographic paper (light-sensitive material) in accordance with image data (exposure condition) processed in the image processing apparatus 12 and a processor 22 for performing development processing on an exposed photographic paper. A monitor 12a for verification such as a CRT monitor or an LCD monitor and an input device 12b such as a keyboard, a mouse or the like are connected to the image processing apparatus 12.

FIG. 2 shows an illustrative detailed construction of the above-described film scanner (hereinafter referred to simply as "scanner") 11. In FIG. 2, reference number 111 denotes a light source lamp; 112, a diaphragm; 113, a mirror box; 114, a diffusion plate; 115, a film to be read; 116, an imaging lens; 117, a dichroic prism; 118, a 3-line CCD sensor for R, G and B (hereinafter also referred to simply as "line sensor"); 119, a 1-line CCD sensor for IR (infrared light)(hereinafter also referred to simply as "IR line sensor"). In addition, reference numbers 120a and 120b indicate an amplifier and an A/D (analog/digital) converter, respectively.

The light source lamp 111 is a lamp which emits light with a visible wavelength band and that with an infrared (IR) wavelength band simultaneously; for example, an incandescent lamp may be used; however, a light source lamp which emits light of the visible wavelength band and a light source lamp which emits light of the infrared wavelength band may separately be provided to be simultaneously turned on and then the resultant light having respective wavelength bands may be put in use for reading after being uniformly mixed by the mirror box 113. Or the light of the visible wavelength band and the light of the infrared wavelength band may be switched for emitting.

The diaphragm 112 for adjusting a light quantity to be introduced into the mirror box 113 with respect to the light emitted from the light source lamp 111 is not limited to any particular type; however, preferably, it is of a type in which an aperture in a slit form is formed in accordance with the line sensors 118 and 119, whereupon light quantity transmitting therethrough is suppressed as a slit light.

The mirror box 113 and the diffusion plate 114 uniformly diffuses light which has been emitted from the light source lamp 111 and has the light quantity thereof adjusted by the diaphragm 112. Thereby the resultant uniformly diffused light is incident on the film 115 with good efficiency. The mirror box 113 and the diffusion plate 114 may use a conventional diffusion box, a diffusion plate such as a ground glass or the like. The diffusion plate 114 may constitute a ceiling of the mirror box 113; however, the mirror box 113 may be provided with a transparent ceiling plate and then the diffusion plate 114 may be provided thereon. The diffusion plate 114 is provided with a moving device 114a for moving the position thereof in a direction of an optical axis. Such a moving device 114a may be of a type which moves only the diffusion plate 114 or another type which moves the mirror box 113 and the diffusion plate 114 integrally.

The film 115 is scan-transported by a moving device 115a in a one-dimensional direction (right and left direction in the figure; hereinafter referred to as "in scanning direction") while the film 115 is being held on or by a platen, a mask or the like having an aperture in a slit form (not shown).

The imaging lens 116 focuses the image recorded on the film 115, that is, light which has passed through the film 115, on the line sensor 118; namely, the imaging lens 116 it has a function to set on the film 115 a focusing position that allows the light which has passed through the film 115 to image on the line sensor 118. In the present invention, the imaging lens 116 has both function of setting on the film the focusing position which allows the light which has passed through the film 115 to be imaged on the line sensor 119 and function of setting the above-described focusing position on the optical element such as the diffusion plate 114 in the image reading optical path. The imaging lens 116 is provided with a focusing device 116a. These both functions for adjusting the focusing position are achieved automatically by the focusing device 116a in accordance with the operator's instruction.

The dichroic prism 117 allows light (visible light) having a visible wavelength band of the light which has passed through the film 115 to pass therethrough and be incident on the line sensor (the 3-line CCD sensor for R, G and B) 118 while it allows light (infrared light or infrared ray) having an infrared wavelength band of the light which has passed through the film 115 to reflect thereon and be incident on the line sensor (the line CCD sensor for IR) 119; it is also called as a dichroic mirror. Though light quantity is decreased, a half mirror may be used in place of the dichroic prism 117.

The 3-line CCD sensor 118 for R, G and B scan-reads the image on the film 115 which is being transported in the scanning direction by the moving device 115a thereby obtaining image information of R, G and B; the light source 111, the diaphragm 112, the mirror box 113, the diffusion plate 114, the imaging lens and the 3-line CCD sensor 118 for R, G and B constitute a first reading device according to the present invention.

The 1-line CCD sensor 119 for IR simultaneously scans and reads the film 115 by the infrared light emitted from the light source 111 by making use of the optical path of the visible light while the film 115 is being transported in the scanning direction a thereby obtaining optical defect information (hereinafter also referred to as "first defect information") derived from the foreign matter such as the dust, dirt, grime or the like, or the scratch such as the abrasion, claw, cut or the like; the light source 111, the diaphragm 112, the mirror box 113, the diffusion plate 114, the imaging lens 116, the dichroic prism 117 and the 1-line CCD sensor 119 for IR constitute a second reading device according to the present invention.

The 1-line CCD sensor 119 for IR can also obtain by using the infrared light (IR) optical defect information (hereinafter also referred to as "second defect information") derived from the folding mark, the foreign matter such as the dust, dirt, grime or the like or the scratch such as the abrasion, claw, cut or the like which is present on the film, namely, in the image on the film and which is illuminated by the visible light.

On such an occasion (obtaining the second defect information), the detecting light needs be the invisible light, for example, the IR (infrared) light; in this case, it is preferable that the focusing position with the imaging lens 116 in which the light passing through the film 115 is imaged on the line sensor 119 is set on the film 115 by means of the focusing device 116a. As described above, when information (first defect information) of the foreign matter, the scratch or the like (adhering to or existing on the diffusion plate 114 or the mirror 144) which is present in the optical path of the visible light is obtained, the focusing position thereof is changed so that it is set on the diffusion plate 114.

The amplifiers 120a and 120a amplify analog signals of R, G and B and analog signal of IR read by respective line sensors 118 and 119, respectively; the A/D converters 120b and 120b convert the analog signals of R, G and B and the analog signal for IR amplified in the above respective steps into respective digital data to produce image information of R, G and B and foreign matter/scratch information (first and/or second defect information), respectively. When so-called prescan is performed before so-called fine scan is performed, the prescan reading an image on the film 115 at a low resolution for setting a reading condition of the fine scan or an image processing condition the fine scan reading the image on the film 115 at a high resolution for obtaining image information of R, G and B for the purpose of producing output image data through image processing is performed, it is preferable that reading of the scanner 11 for obtaining the information of the foreign matter, scratch or the like in the optical path (first defect information) is executed by the prescan; however, it may be executed by the fine scan. Whereas, it is preferable that reading for obtaining the information of the foreign matter, the scratch or the like which is present on the film 115 (second defect information) is executed by the fine scan; however, it may be executed by the prescan.

As shown in FIG. 2, the image information of R, G and B read by the 3-line CCD sensor 118 for R, G and B are sent therefrom to a subsequent step (image processing apparatus 12) as digital data while the foreign matter/scratch information detected by the infrared light is sent from the 1-line CCD sensor 119 for IR to the subsequent step (image processing apparatus 12).

Though not shown, the scanner 11 is commonly provided with a detecting device for reading a type of film to be processed (negatives/positives, presence/absence of magnetic layer, color/monochrome and the like) or an indicator for indicating the type of film.

In the scanner 11 shown in FIG. 2, the light source lamp 111 is disposed approximately right under the film 115 to emit light approximately right upward therefrom and the emitted light is changed by the diaphragm 112 into a slit light that is subsequently changed by the mirror box 113 and the diffusion plate 114 into a uniform diffusion light in a slit form which is then incident on the film 115 from approximately right under it; however, as illustrated in the scanner 14 shown in FIG. 3, the light source lamp 111 may be disposed such that it is shifted from the film 115 and light emitted therefrom is adjusted focuswise by the lens 142 and then reflected by the mirror 144 into a right upward direction to illuminate the film 115 as a slit light. On this occasion, it is preferable that the lens 142 and the mirror 114 are provided with moving devices 142a and 144a, respectively.

Moreover, in the scanners 11 and 14 shown in FIGS. 2 and 3 respectively, a visible light and an invisible light are separated from each other using the dichroic prism 117 and read by the 3-line CCD sensor 118 for R, G and B and the one-line CCD sensor 119 for IR, respectively; however, the present invention is not limited to the above type, but reading by a 4-line CCD for R, G, B and IR may be performed.

Figure 4:
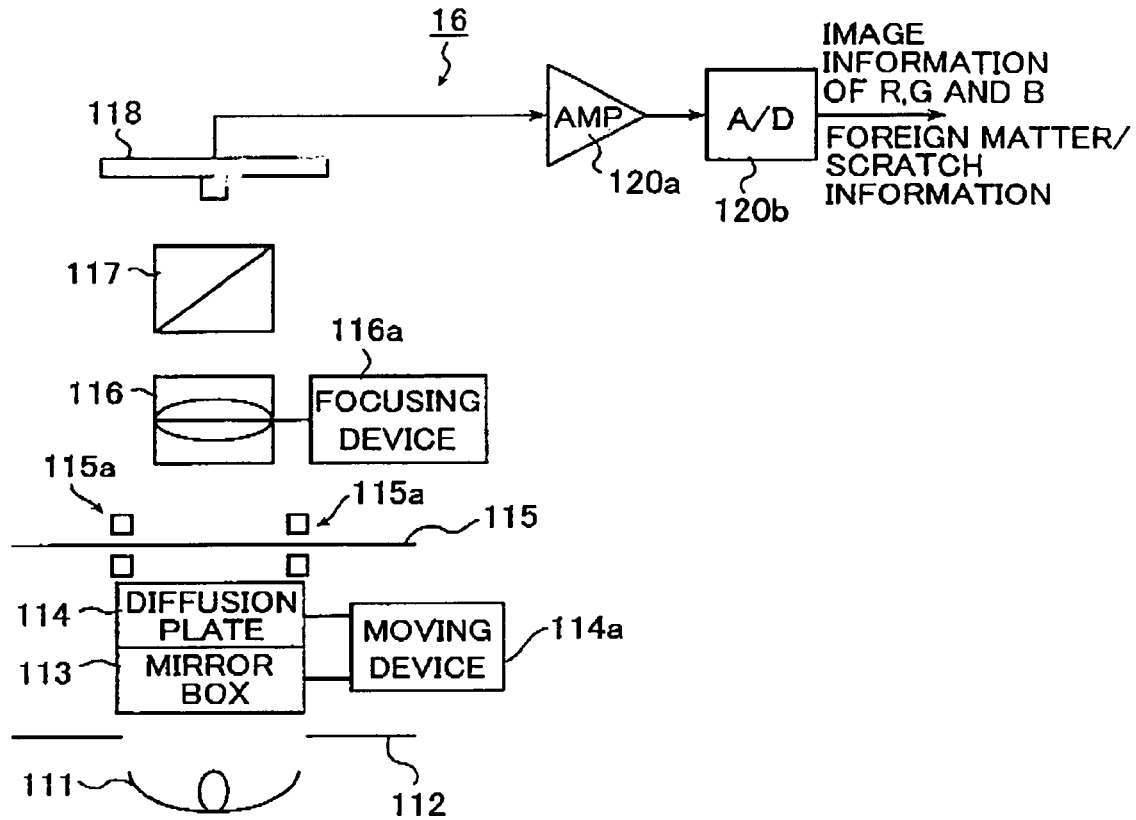
FIG. 4 is a diagrammatic view showing an illustrative construction of another embodiment of the film scanner used in the photographic processing machine shown in FIG. 1.

Further, in the scanners 11 and 14 shown in FIGS. 2 and 3 respectively, the image information of R, G and B of the image on the film 115 are read by the 3-line CCD sensor 118 for R, G and B using a visible light while information of the foreign matter, the scratch or the like which is present on (adhering to or produced on) the film 115 or in the optical path is read by the 1-line CCD sensor 119 for IR using an infrared light (IR) as a detecting light; however, the present invention is not limited to the above type, but, as shown in scanner 16 of FIG. 4, not only image information of R, G and B but also information of the foreign matter, the scratch or the like may be read by the 3-line CCD sensor 118 for R, G and B using the visible light.

Furthermore, it is preferable that, when information of the foreign matter, scratch or the like is read by the 3-line CCD sensor 118 for R, G and B using the visible light, the focusing position of the imaging lens 116 is changed by the focusing device 116a from on the film 115 to on the optical element, such as on the diffusion plate 114 (the mirror 144 in the case of the light source disposition as shown in FIG. 3) or the like.

Furthermore, when information of the foreign matter, =scratch or the like is read by the 3-line CCD sensor 118 for R, G and B using the visible light, various types of reading methods can be executed. As a most preferable method, light emitted from the light source 111 is read without disposing the film 115 in the optical path for the same specified period of time as in the case of scanning while the film 115 is transported by the moving device 115a. As a more preferable method, an unexposed portion of film such as a negative, a positive or the like is used; in this case, the unexposed portion is scanned while it is transported by the moving device 115a to read light which passes through the unexposed portion. Furthermore, as another method, though detecting accuracy is deteriorated since distinction from the image information of R, G and B becomes difficult, the film 115 carrying an image to be read is scan-read while it is disposed in the optical path and transported by the moving device 115a. On this occasion, the focusing position of the imaging lens 116 need be put on the optical element such as the diffusion plate 114 or the mirror 144 in the optical path by all means.

In embodiments shown in FIGS. 2, 3 and 4, a relative movement of the film 115 and the line sensor 118 or 119 for performing scan-reading by the line sensors 118 and 119 is performed by a method which transports the film 115 by the moving device 115a, namely, transports an original; however, this is not the sole case of the present invention. In a scanner 18 as shown in FIG. 5, a method of mirror scan which performs scan while the mirror in the optical path is moved.

Figure 5:
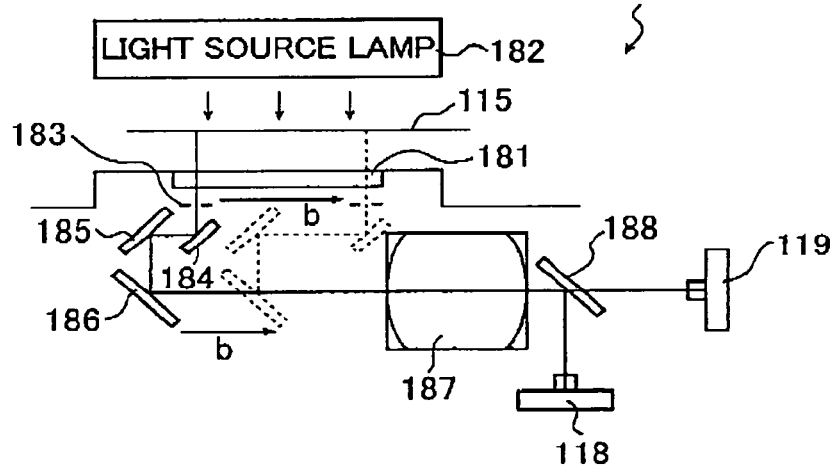
FIG. 5 is a diagrammatic view showing an illustrative construction of another embodiment of the film scanner used in the photographic processing machine shown in FIG. 1.
Figure 6:
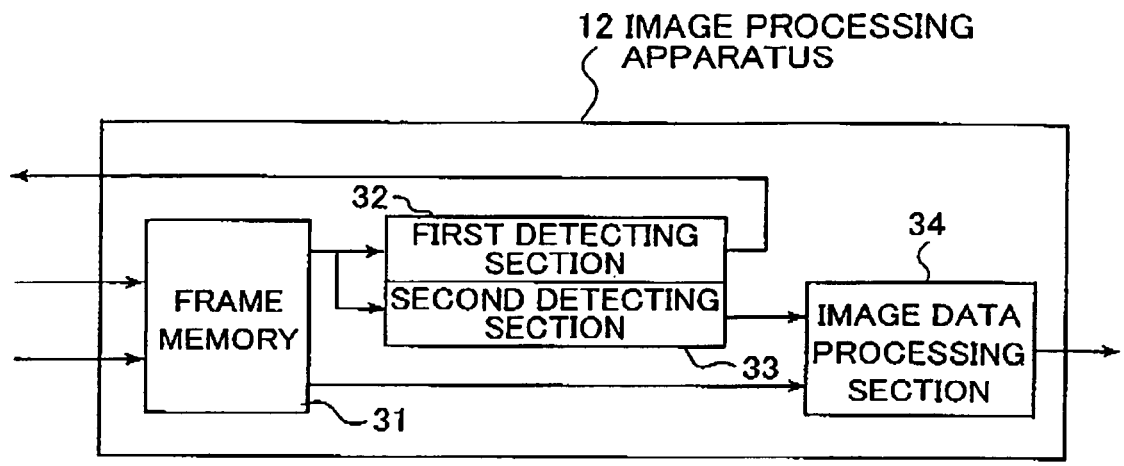
FIG. 6 is a block diagram showing an illustrative construction of an embodiment of an image processing apparatus used in the photographic processing machine shown in FIG. 1.

The scanner 18 shown in FIG. 5 includes a light source 182 for illuminating with light a whole area of the film 115 placed on a platen 181 (transparent table for an original), a first unit and a second unit. The first unit has an aperture diaphragm 183 for changing light which passes through the film 115 into the light in a slit form and a first mirror 184 for reflecting the slit light from the aperture diaphragm 183 at 90 degrees, and scans the film 115 by moving in a direction of an arrow b (scanning direction) in FIG. 5. The a second unit has a second mirror 185 for reflecting the light reflected by the first mirror 184 at 90 degrees, and a third mirror 186 for reflecting the light reflected by the second mirror 185 at 90 degrees, and interlocks with the first unit to move in the direction of the arrow b at half the speed of the first unit. The scanner 18 further includes an imaging lens 187 for imaging the light reflected by the third mirror 186, a dichroic mirror 188 for separating the visible light and the infrared light from each other by reflecting the visible light and allowing the infrared light to pass therethrough, the 3-line CCD sensor 118 for R, G and B which is disposed in a focusing position of the imaging lens 187 and which reads the visible light reflected by the dichroic mirror 188 and the 1-line CCD sensor 119 for IR which is also disposed in a focusing position of the imaging lens 187 and which reads the infrared light passing through the dichroic mirror 188.

Next, the image processing apparatus 12 comprises a frame memory 31, a first detecting section 32, a second detecting section 33 and an image data processing section 34.

The first detecting section 32 stores image information of R, G and B and foreign matter/scratch information (first and second defect information) such as image information of IR which are read by the scanners 11 (14, 16 and 18). The a first detecting section 32 reads digital data which are the foreign matter/scratch information (first defect information) of IR, image information of R, G and B stored in the frame memory 31 to detect at least one image data defect (first image data defect) of the foreign matter which adheres and the scratch which exists in the optical path of the visible light on the basis of the light quantity data changes in the scanning direction from the thus read digital data. The second detecting section 33 reads digital data which are the image information of IR, namely, the foreign matter/scratch information (second defect information) stored in the frame memory 31 to detect at least one image data defect (second defect of image data) of the folding mark, foreign matter, and scratch which exist on the film 115 on the basis of light quantity changes from the thus read digital data. The image data processing section 34 reads the image information of R, G and B stored in the frame memory 31 and performs various types of conventional image processing. When the second defect of the image data such as the folding mark, foreign matter, the scratch or the like is detected by the second detecting section 33, defect correction processing (so-called scratch vanishing processing) which corrects the thus detected second defect using image data of the peripheral pixels thereof is performed to produce output image data.

The first detecting section 32 reads the foreign matter/ scratch information (first defect information) which have previously been read by the 1-line CCD sensor 119 for IR in the cases of the scanners 11, 14 and 18 shown in FIGS. 2, 3 and 5, respectively or by the 3-line CCD sensor 118 for R, G and B in the case of the scanner 16 shown in FIG. 4 and stored in the frame memory 31, obtains a light distribution of the thus read image data. The first detecting section 32 continuously detects the light quantity data changes in the scanning direction in a given specified sensor position (specified position in a direction perpendicular to the scanning direction) of the 1-line CCD sensor 119 for IR or the 3-line CCD sensor 118 for R, G and B, namely, detects a changed portion of the light quantity data in a streak form, thereby to detect defect (first defect) of image data derived from the foreign matter which adheres or the scratch which exists in the optical path.

It is conceivable that the foreign matter such as the dust or the like adheres in the optical path, for example, to the optical element (such as the diffusion plate 114, the mirror 144 or the like) in the optical path while the film 115 is being read by the scanners 11 (14, 16, 18 and the like). On this occasion, abnormality of light quantity data in a streak form is produced in a given specified sensor position of the 1-line CCD sensor 119 for IR or the 3-line CCD sensor 118 for R, G and B during scanning in the same way as described above. Therefore, the first detecting section 32 detects abnormality of light quantity data in a streak form, whereby the first defect of the image data caused by the foreign matter such as the dust or the like which adheres in the optical path during the reading operation can be detected. Moreover, such detection of the first defect of the image data caused by the foreign matter such as the dust or the like which adheres in the optical path during the reading operation can also be performed by the second detecting section 33, though the detection accuracy is not high.

The second detecting section 33 detects defect (second defect) of the image data caused by the foreign matter which adheres to or the scratch which exists on the film 115 by means of detecting a portion (pixel region) with luminance over a specified threshold value.

By means of such ways described above, the foreign matter, scratch or the like which adheres to or exists on the optical element in the optical path or the image recording medium such as the film 115 or the like can be detected; as a result, output image data which is free from the influence or has a less influence, of the first defect derived from the foreign matter, scratch or the like in the optical path can be outputted from the image processing apparatus 12. Further, output image data can be outputted from the image processing apparatus 12 in which the second defect derived from the foreign matter, scratch or the like on the image recording medium such as the film 115 or the like is corrected or changed to be less conspicuous.

The output image data which has thus been outputted from the image processing apparatus 12 and which is free from the influence, or has the less influence, of the first and second image defects is inputted into the image outputting apparatus 13.

A printer 21 of the image outputting apparatus 13 exposes the photographic paper with light beams modulated in accordance with the thus inputted output image data; a processor (developer) 22 thereof performs development, bleaching, fixing, rinsing, and drying on the exposed photographic paper to produce a finished print.

The thus produced finished print can be a print reproducing a high-quality image that is free from the influence, or has the less influence, of the foreign matter which adheres to or the scratch which exists on the optical element in the optical path or the image recording medium such as the film or the like.

Figure 7:
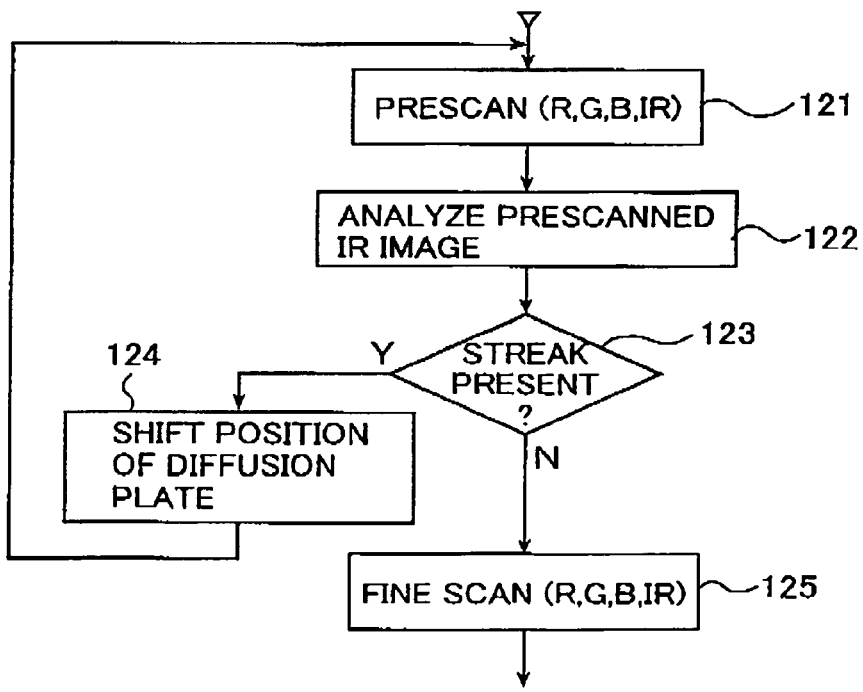
FIG. 7 is a flowchart showing illustrative operations of the image processing apparatus used in the photographic processing machine shown in FIG. 1, focussing on operations of the film scanner shown in FIG. 2.

FIG. 7 shows an embodiment of operations of the above-described image processing apparatus 12 focusing on operations of the scanner 11. In the figure, reference numbers 121 to 125 indicate steps illustrating the operations, namely, 121 indicates each prescan of R, G, B and IR; 122, analysis of the prescanned IR image; 123, judgment on whether or not a streak (continuous light quantity abnormality) caused by the foreign matter/scratch is present; 124, "moving of a position of the diffusion plate" as a countermeasure to be taken when the streak (light quantity abnormality in a streak form) is present; 125, fine scan, that is, a step to be taken when the streak (light quantity abnormality in a streak form) is absent.

Operations of the photographic processing machine 10 according to the present embodiment are now described.

When film to be processed is set in the scanner 11, firstly the scanner 11 detects the type of the film. In this case, for the purpose of simplicity of explanation, it is assumed that the film is detected as a color negative film of 135 size (no magnetic layer thereon; no APS).

Next, the scanner 11 performs a first reading (prescan) on the film by R, G, B and IR lights (step 121 as shown in FIG. 7). As a result, image data of three colors R, G and B (image information of R, G and B) and a detection result of the foreign matter or the scratch by the IR light (foreign matter/scratch information) are obtained. These data are sent to a subsequent step, namely, the image processing apparatus 12.

The image processing apparatus 12 not only displays the foreign matter/scratch detection result (foreign matter/scratch information) obtained by the IR light from among the above-described data sent from the scanner 11 on the CRT monitor 12a but also analyzes the thus obtained result in the first detecting section 32 (step 122). Such an analysis is performed by comparing predetermined threshold values of various characteristic values and characteristic values obtained from the above-described data sent from the scanner 11; however, it is of course permissible to ask for judgment of the operator as to whether or not the foreign matter or the scratch is present.

As a result of the above analysis, when abnormality (of light quantity) in a streak form (first defect of image data) which is conceivable to have been produced by the presence of the foreign matter/scratch in the optical path within the scanner 11 is noticed in the IR prescanned image sent from the scanner 11 (judgment "Y" in a step 123), processing advances to a step 124 and then, for example, a countermeasure is taken such as changing a position of the diffusion plate 114 by the moving device 114a or otherwise which allows the foreign matter/scratch to be less conspicuous is taken.

When the judgment in the step 123 is "N", namely, abnormality (of light quantity) in a streak form which is conceivable to have been produced by the presence of the foreign matter/scratch in the optical path within the scanner 11 is not noticed, processing advances to a step 125. In the step 125, respective fine scan of R, G, B and IR are performed to obtain respective image data and then, IR image information (image data) from among the thus obtained respective image data is analyzed in the second detecting section 33 to detect the foreign matter/scratch. Thereafter, on the basis of the obtained R, G and B image data, necessary processing, for example, a foreign matter/scratch correction, various image processing and the like are performed.

More specifically, it is preferable that the respective prescan of R, G, B and IR in the step 121 are performed, for example, by using a sensor block constructed as described below. The sensor block which constitutes the scanner 11 is such that respective line sensors 118R, 118G, 118B and 119 for R, G, B and IR are integrally constructed, for example, via a dichroic prism 117 as shown in FIG. 8.

Figure 8:
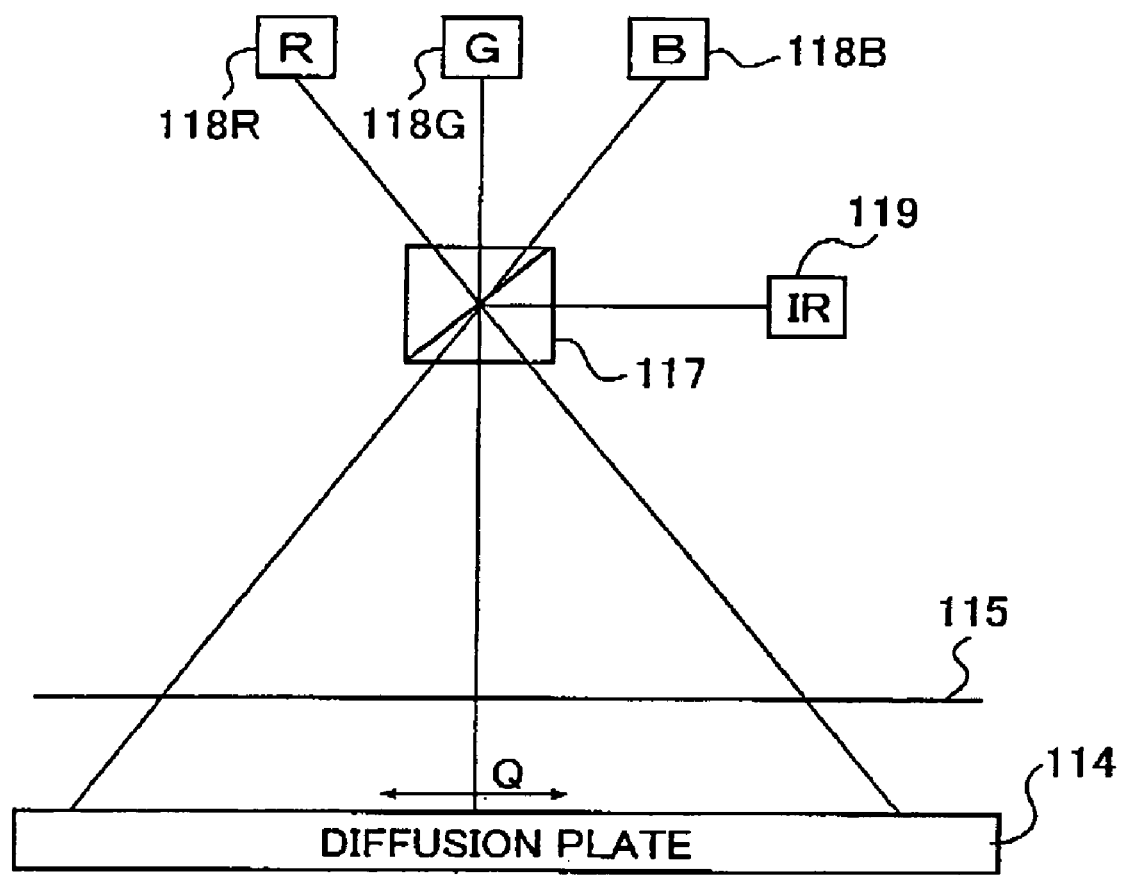
FIG. 8 is a diagrammatic view of an illustrative detailed construction of a part of the film scanner shown in FIG. 2.

In a state as shown in FIG. 8, an area on the diffusion plate to be read by the line sensor 119 for IR is limited within a small area, for example, as shown by an arrow Q in the figure. On this occasion, the area to be read can be adjusted, if necessary, such that a pair of the dichroic prism 117 and the line sensor 119 for IR move their positions with respect to the line sensors 118 for R, G and B (allowing no relative displacement between them).

Preferably, the above-described sensor block is ordinarily moved in a right or left direction (scanning direction) in the figure, namely, on a horizontal plane. However, it should be noted that the movement of the sensor block is not limited to such a type but it can of course be rotated about an axis extending in a direction perpendicular to the plane of paper in the figure. By taking the latter construction, it easily becomes possible to set the foreign matter/scratch detection area in a desired position if necessary.

Moreover, as described above, if the focusing position is moved (shifted) onto the diffusion plate 114, not on a surface of film as usually done, at the time of IR reading, then a contrast of the foreign matter/scratch is enhanced thereby easily detecting the foreign matter/scratch on the diffusion plate 114. On the other hand, the contrast of the foreign matter/scratch on the surface of film 115 is deteriorated whereupon an effect can be obtained such that only the foreign matter/scratch on the diffusion plate 114 can easily be detected. Namely, if the focusing position is on the surface of film 115, the contrast of the foreign matter/scratch on the diffusion plate 114 is deteriorated so that the above step is taken to compensate for such deterioration.

The foregoing description has been directed to an example of scan which is performed separately from R, G and B by shifting the focusing point only of the IR line sensor 119 onto the diffusion plate 114; however, it is permissible to perform scan simultaneously with R, G and B by shifting the position of the IR line sensor 119.

In practice, since the foreign matter does not always adhere only to the diffusion plate 114 in the optical path within the scanner 11, it is preferable that respective scanning methods are set corresponding to the constructions of the apparatuses.

On this occasion, as a means to judge the size of the foreign matter which is present in the optical path, a color of an image of the foreign matter is available as a reference. Namely, when the foreign matter in the optical path is as small as few score μm and located in a position approximately opposite to a G sensor in the construction of the sensor block as shown in FIG. 8, the image of the foreign matter ordinarily has a magenta color. When the foreign matter is substantially larger than the above size, the image of the foreign matter has a color close to gray (achromatic color). This is caused by ratios of light incident on respective R, G and B line sensors in the sensor block.

The above-described embodiment shows an example according to the present invention; however, the present invention is by no means limited to the embodiment.

For example, in the above-described embodiment, an example in which the detection of the foreign matter/scratch in the optical path is executed at the time of prescan and then, based on a result, the position of the diffusion plate is shifted or the foreign matter is removed by a brush to prevent the foreign matter/scratch from appearing on a print is shown. However, needless to say, the foreign matter/scratch both in the optical path and on the film may be detected at the time of fine scan to correct them.

Moreover, when an auto-setup operation is executed using prescanned image data to set a table for use in color temperature conversion of the image data, the foreign matter/scratch may cause a detrimental influence in some cases. For example, in a negative image, the foreign matter may erroneously be evaluated as a highlight in the image thereby causing a risk of performing an abnormal setting. To deal with this problem, it is preferable that the auto-setup is executed by using the prescanned image data obtained in a state that the foreign matter/scratch is not present in the optical path and/or on the film or in a state that the prescanned image data obtained is corrected, if such foreign matter/scratch is present.

Furthermore, films to be read are used irrespective of the type and mode thereof, namely, negatives, positives, those with or without a magnetic layer thereon and the like. However, in the case of a monochrome film, silver as a constituent of the image absorbs the IR so that detection of the foreign matter/scratch in the optical path can not be executed as far as the monochrome film is located in the optical path.

As described above in detail, according to the present invention, the film reading method which reads the image on the image recording medium such as film or the like by the visible light, prevents the foreign matter, scratch or the like on the image recording medium and in the reading optical path of the image recording medium from being transferred onto the print image through detecting at least the foreign matter, scratch or the like in the reading optical path of the image recording medium by the specified detecting light, preferably, the invisible light. The film reading method can obtain a high-quality print image, and the image reading apparatus executing the method can be achieved.

In addition, according to the present invention, image data defects derived from the image recording medium can be discriminated in a sure and precise way.

What is claimed is:

1. An image reading method which reads an image on an image recording medium by a visible light, comprising the steps of:

scanning an invisible light in a first direction using an optical path of the visible light and simultaneously reading the invisible light one-dimensionally in a second direction which is perpendicular to the first direction after a focusing position of the invisible light is set on a position of an optical element disposed in the optical path of the visible light, the focusing position being different from a position of the image recording medium;

determining from the read invisible light whether light quantity data of the one-dimensionally read invisible light contains a portion where the light quantity data changes at a reading position during the one-dimensional reading; and detecting at least one of a foreign matter and a scratch on the optical element based on a result of the determining operation;

scanning an invisible light on the recording medium and reading the scanned invisible light; and detecting, by the invisible light, the at least one of the foreign matter and the scratch on the recording medium, wherein focusing positions of the invisible light are different from one another between the time when at least one of the foreign matter and the scratch on the optical element disposed in the optical path is detected by the invisible light and the time when at least one of the foreign matter and the scratch on the image recording medium is detected by the invisible light.

2. The image reading method according to claim 1, wherein the one-dimensional reading is performed by a line sensor.

3. The image reading method according to claim 2, wherein the scanning is performed by allowing the image recording medium and the line sensor to move relative to each other by transferring the image recording medium in relation to the line sensor.

4. The image reading method according to claim 2, wherein the scanning is performed by transferring a mirror reflecting the invisible light in the optical path.

5. The image reading method according to claim 1, further comprising the step of issuing an alarm, when at least one of the foreign matter and the scratch in the optical path is detected.

6. The image reading method according to claim 1, wherein the optical element is at least one of a diffusion plate and a mirror.

7. The image reading method according to claim 1, wherein a position of the optical element is changed in accordance with a detection result of at least one of the foreign matter and the scratch in the optical path.

8. The image reading method according to claim 1, wherein a detection area for detecting at least one of the foreign matter and the scratch in the optical path is adjusted.

9. The method of claim 1, further comprising changing a focusing position of the invisible light to the recording medium to determine a defect portion on the recording medium.

10. The image reading method according to claim 1, wherein the optical element on which the focusing position is set is an element disposed on a midway of the optical path to a reading position of the invisible light.

11. An image reading apparatus, comprising:
a first reading unit for reading an image on an image recording medium by a visible light and reading an invisible light which is scanned on the image recording medium, the focusing position of the invisible light set on a position of the image recording medium;
a second reading unit for scanning an invisible light in a first direction using an optical path of the visible light and simultaneously reading the invisible light one-dimensionally in a second direction which is perpendicular to the first direction after a focusing position of the invisible light is set on a position of an optical element disposed in the optical path of the visible light, the focusing position being different from a position of the image recording medium;
a first detecting unit which determines from the read invisible light by the second reading unit whether light quantity data of the one-dimensionally read invisible light contains a portion where the light quantity data changes at a reading position during the one-dimensional reading, and which detects at least one of a foreign matter and a scratch on the optical element, based on whether the light quantity data contains the portion where the light quantity data changes at the reading position; and
a second detecting unit for detecting at least one of the foreign matter and the scratch on the image recording medium from the read invisible light by the first reading unit.

12. The image reading apparatus according to claim 11, wherein the second reading unit comprises a line sensor and a moving device for moving the invisible light in the first direction relative to the line sensor, and wherein the first detecting unit detects at least one of the foreign matter and the scratch by detecting the change of the light quantity data in a line shape at a constant sensor position of the line sensor.

13. The image reading apparatus according to claim 12, wherein the second reading unit allows the image recording medium and the line sensor to move relative to each other by transferring the image recording medium in relation to the line sensor by means of the moving device.

14. The image reading apparatus according to claim 12, wherein the second reading unit scans the invisible light by transferring a mirror reflecting the invisible light in the optical path with the moving device.

15. The image reading apparatus according to claim 11, further comprising an alarming device for issuing an alarm when the first detecting device detects at least one of the foreign matter and the scratch in the optical path.

16. The image reading apparatus according to claim 11, wherein the optical element is at least one of a diffusion plate and a mirror.

17. The image reading apparatus according to claim 11, further comprising a first changing device for changing a position of the optical element when the first detecting unit detects at least one of the foreign matter and the scratch in the optical path.

18. The image reading apparatus according to claim 11, further comprising an adjusting device for adjusting a detection area for detecting at least one of the foreign matter and the scratch in the optical path.

19. The image reading apparatus according to claim 11, further comprising a second changing device for changing focusing positions of the invisible light and the visible light in accordance with whether at least one of the foreign matter and the scratch in the optical element is detected by the invisible light or at least one of the foreign matter and the scratch on the image recording medium is detected by the invisible light.

20. The image reading apparatus according to claim 11, further comprising:
a second changing device for changing focusing positions of the invisible light in accordance with whether at least one of the foreign matter and the scratch is detected by the invisible light on the optical element or on the image recording medium.

21. The apparatus of claim 11, further comprising focusing changing means for changing the focusing position of the invisible light between the optical element and recording medium.

22. The image reading apparatus according to claim 11, wherein the optical element on which the focusing position is set is an element disposed on a midway of the optical path to a reading position of the invisible light.

* * * * *